(12) United States Patent
Razavilar et al.

(10) Patent No.: US 6,879,840 B2
(45) Date of Patent: Apr. 12, 2005

(54) METHOD AND APPARATUS FOR ADAPTIVE QOS-BASED JOINT RATE AND POWER CONTROL ALGORITHM IN MULTI-RATE WIRELESS SYSTEMS

(75) Inventors: Javad Razavilar, San Diego, CA (US); Neeraj Poojary, San Diego, CA (US); Dennis P. Connors, San Diego, CA (US); James A. Crawford, San Diego, CA (US)

(73) Assignee: M2 Networks, Inc., San Diego, CA (US)

( * ) Notice: Subject to any disclaimer, the term of this patent is extended or adjusted under 35 U.S.C. 154(b) by 328 days.

(21) Appl. No.: 10/000,230

(22) Filed: Nov. 30, 2001

(65) Prior Publication Data
US 2003/0104831 A1 Jun. 5, 2003

(51) Int. Cl.[7] .............................. H04B 7/00; H04Q 7/20
(52) U.S. Cl. ......................................... 455/522; 455/69
(58) Field of Search ....................... 455/522, 69, 67.11, 455/67.14, 63.1, 423, 452.2; 370/465

(56) References Cited

U.S. PATENT DOCUMENTS

| | | | | |
|---|---|---|---|---|
| 5,528,593 A | * | 6/1996 | English et al. | 370/391 |
| 5,603,096 A | * | 2/1997 | Gilhousen et al. | 455/69 |
| 5,822,318 A | | 10/1998 | Tiedemann, Jr. et al. | 370/391 |
| 5,987,326 A | * | 11/1999 | Tiedemann et al. | 455/442 |
| 6,075,974 A | | 6/2000 | Saints et al. | 455/69 |
| 6,366,763 B1 | * | 4/2002 | Ue et al. | 455/69 |
| 6,535,723 B1 | * | 3/2003 | Jiang et al. | 455/245.1 |

FOREIGN PATENT DOCUMENTS

| | | | | |
|---|---|---|---|---|
| EP | 0986282 A1 | | 3/2000 | H04Q/7/38 |
| EP | 986282 A1 | * | 3/2000 | H04Q/7/38 |

OTHER PUBLICATIONS

Qiu et al, *On the Performance of Adaptive Modulation in Cellular Systems*, IEEE Transactions On Communications, Jun. 1999, pp. 884–895, vol. 47, No. 6.

Foschini et al., "A Simple Distributed Autonomous Power Control Algorithm and Its Convergence", IEEE, Transactions on Vehicular Technology, Nov. 1993, pp. 641–646, vol. 42, No. 4.

* cited by examiner

*Primary Examiner*—Vivian Chin
*Assistant Examiner*—Lewis West
(74) *Attorney, Agent, or Firm*—Fitch, Even, Tabin & Flannery (57) ABSTRACT

A rate and power control algorithm for a communication system, the algorithm including the steps of: assigning a target channel condition metric to be met at a first terminal for signaling received from each of one or more remote terminals of the system, each terminal supporting a plurality of rates and a plurality of transmit power levels, each target channel condition metric based upon the type of service supported by each remote terminal; receiving a signal at the first terminal from each remote terminal; and adjusting a respective target channel condition metric assigned for a respective remote terminal in response to signal information generated from the received signal. In variations, the algorithm is performed in a distributed manner by different cells of a communication system and at least two of the remote terminals support traffic of different types of service.

46 Claims, 5 Drawing Sheets

METHOD AND APPARATUS FOR ADAPTIVE QOS-BASED JOINT RATE AND POWER CONTROL ALGORITHM IN MULTI-RATE WIRELESS SYSTEMS

BACKGROUND OF THE INVENTION

1. Field of the Invention

The present invention relates generally to rate and power control in a communication system supporting multiple bit rates and power levels, and more specifically to rate and power control for determining and controlling the rate and power of a transmitter communicating with a receiver in a communication system. Even more specifically, the present invention relates to a rate and power control algorithm that may be used in a wireless communication network.

2. Discussion of the Related Art

In many communication systems, it is desirable to maximize system throughput or capacity. Throughput is a function of the signal-to-interference ratio (SIR) at a receiver and the modulation scheme used at a transmitter communicating with the receiver and may be defined as the number of bits that can be transmitted successfully to the receiver within each transmitted symbol. The SIR at a given receiver in a communication network is a function of the transmit power of all other users in the network or system. The transmit powers of unwanted users may cause interference (which may be referred to as co-channel interference) and can potentially reduce the SIR for the desired user or receiver. Co-channel interference is one of the main impairments that degrade performance in a wireless link.

One method to reduce the effect of co-channel interference is to employ power control techniques. One technique is known as the SIR-balancing approach in which a fixed target SIR must be met for signaling received at all terminals in the communication system or network. For example, in a TDMA cellular voice network, a fixed target SIR of 12 dB must be met for each user. Then, the transmit powers for each user in the system are constantly increased if the measured SIR of the signaling is too low (in comparison to the target SIR) for any one user while the transmit powers are decreased if the measured SIR of the signaling is too high in comparison to the fixed target SIR. Thus, this approach attempts to improve the weakest link within the communication system.

However, in the SIR balancing approach, the target SIR is fixed and is the same for all users in the system. This is due to the fact that there are no different quality of service (QoS) requirements in the system and that all links in the system are to be treated equally. For example, such systems only transmit voice or only transmit data traffic, each of which have a separate quality of service, i.e., a separate fixed target SIR to be met for each type of traffic. Such an SIR-balancing approach would not work effectively in a wireless multimedia communication system that supports multiple types of traffic (e.g., voice, data, video) simultaneously having multiple QoS requirements.

Furthermore, conventional SIR-balancing approaches have the potential to become unstable. A power change by an individual terminal in the system to maintain the fixed target SIR will in turn affect the interference seen by all other terminals and create some degree of positive feedback (instability) between the individual power control processes. Namely, when a terminal raises its transmit power to meet the fixed target SIR, the raise of power, in turn results in the increase of interference with other terminals. As a remedy, other terminals have to raise their own transmit power accordingly. This may lead to instability in the system in that all the terminals will raise their power until they all hit the maximum power limit. Since the SIR is a ratio, the terminals will eventually hit the upper limit of transmit power, without achieving the fixed target SIR.

SUMMARY OF THE INVENTION

The present invention advantageously addresses the needs above as well as other needs by providing a joint rate and power control algorithm in a communication system supporting multiple data rates, multiple power levels, and multiple quality of service (QoS) traffic.

In one embodiment, the invention can be characterized as a method, and means for accomplishing the method, of rate and power control in a communication system, the method including the steps of: assigning a target channel condition metric to be met at a first communication terminal for signaling received from each of one or more remote communication terminals of the communication system, each communication terminal supporting a plurality of rates and a plurality of transmit power levels, each target channel condition metric based upon the type of service supported by each of the one or more remote communication terminals; receiving a signal at the first communication terminal from each of the one or more remote communication terminals; and adjusting a respective target channel condition metric assigned for a respective one of the one or more remote communication terminals in response to signal information generated from the received signal from the respective one of the one or more remote communication terminals.

In another embodiment, the invention can be characterized as a rate and power control device for a communication terminal of a communication system comprising a rate and power control module for performing the following steps: obtaining an assigned target channel condition metric to be met at a first communication terminal for a signal received from each of one or more remote communication terminals, each communication terminal supporting a plurality of rates and a plurality of transmit power levels, the assigned target channel condition metric based upon the type of service supported by each of the one or more remote communication terminals; and adjusting a respective assigned target channel metric for a respective one of the one or more of remote communication terminals in response to signal information generated from the signal received from the respective one of the one or more remote communication terminals.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

Figure 1:
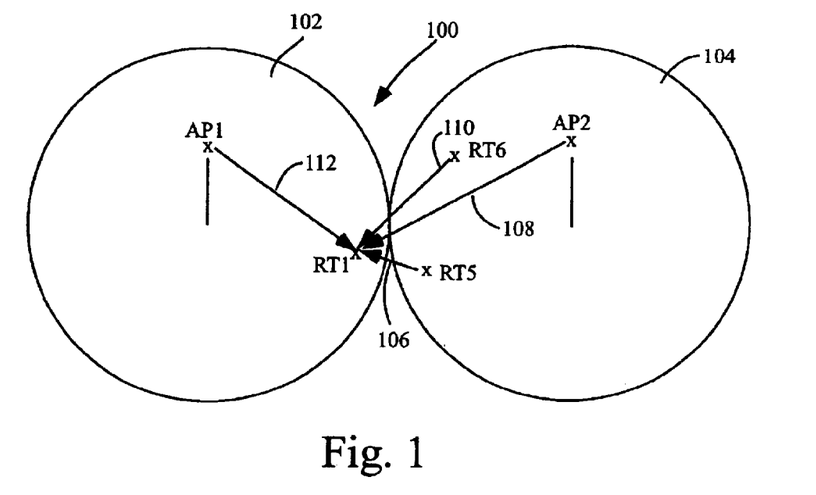
FIG. 1 is a diagram illustrating co-channel interference between communicating terminals of adjacent cells of a communication system.

Referring first to FIG. 1, a diagram is shown illustrating co-channel interference between communicating terminals of adjacent cells of a communication system. Illustrated are two cells 102 and 104 of a communication system 100, cell 102 including access point 1 (AP1), and cell 104 including access point 2 (AP2). AP1 communicates with remote terminal 1 (RT1) in cell 102, while in cell 104, AP2 communicates with remote terminals 5 and 6 (RT5 and RT6).

Each access point, AP1 and AP2 share the same channel for uplink and downlink transmissions. Such a communication system 100, for example, may comprise a wireless indoor network or a terrestrial cellular network. Focusing on the activity within cell 102, let AP1-RT1 denote a desired transmitter-receiver pair. Furthermore, in one embodiment, AP1 and RT1 transmit packets using a Time Division Multiple Access/Time Division Duplex (TDMA/TDD) scheme within cell 102; however, in other embodiments, AP1 and RT1 may communicate using any known multiplexing scheme. As is illustrated by arrows 106, 108 and 110, AP2, RT5 and RT6 in cell 104 cause interference during downlink/uplink transmissions of the terminals in cell 102. For example, during the downlink transmission 112 from AP1 To RT1 in cell 102, AP2 causes interference 108 during its downlink transmission destined for RT5 and RT6. Also RT5 and RT6 cause interference 106 and 110 on the downlink transmission 112 in cell 102, during their uplink transmissions destined for AP2. This interference, illustrated as arrows 106, 108 and 110 may be referred to as co-channel interference and is a large source of impairment that degrades performance in the wireless links of cell 102. Co-channel interference is especially problematic in a dense deployment environment, such as illustrated, where adjacent cells are in close proximity.

Now assume that N−1 different links or transmit-receive pairs in cell 104 cause interference in the downlink transmission 112 in cell 102, where N is the number of terminals in cell 104. Let $G_{ij}$ denote the link gain from transmitter j (e.g., AP1) to receiver i (e.g., RT1), and Pj denote the power of transmitter j. The link gain $G_{ij}$ is related to the path loss $L_{ij}$. The path loss is proportional to $d_{ij}^k$, where k is the path loss exponent. Therefore, the path loss $L_{ij}$ in dB, assuming ideal free-space path loss with path loss exponent k=2, is given by:

$$L_{ij} = 20\log(4\pi d_{ij}/\lambda) + L_\sigma \quad \text{Eq. (1)}$$

where $d_{ij}$ is the distance between transmitter j and receiver i, $\lambda = c/f$ is the wavelength, and $L_\sigma$ is a lognormal shadow fading with zero mean and variance σ, with σ=3~8 dB. Now, the link gain $G_{ij}$ is given by:

$$G_{ij} = 10^{-L_{ij}/10} \quad \text{Eq. (2)}$$

It is noted that given the path loss (L), the noise floor ($N_0$), the transmit power ($P_t$), the modulation scheme, and the minimum detectable signal (MDS) at the receiver (receiver sensitivity), one can compute the range (distance between a transmit-receive pair) over which reliable communication is feasible. In this context, reliable communication means, achieving a minimum required signal-to-interference ratio (SIR) or a required signal-to-noise ratio (SNR) for a given constellation. This type of analysis is known as Link Budget Analysis. In this analysis, the noise floor is $N = N_0 BF$, where $N_0 = -174$ dBm/Hz and B is matched filter bandwidth in Hz (also know as the noise bandwidth), and F is the receiver Noise Figure (NF) of 5 to 10 dB. For example, in some embodiments of a physical layer design, B=20 MHz. The received signal-to-interference ratio (SIR) defines the link budget:

$$\gamma = \frac{P_r}{N} = \frac{E_s}{N_0} \times \frac{R_s}{B} \quad \text{Eq. (3)}$$

Where $P_r$ is the received power, $E_s$ is the symbol energy and $R_s$ is the symbol rate. The receiver sensitivity $S_R$ is defined as:

$$S_R = kT_0 F(E_s/N_0) R_S \quad \text{Eq. (4)}$$

where in equation (4) all variables are in linear scale, $T_0$ the temperature is equal to 290 K. Thus, the maximum allowable path loss, $L_{max\ dB}$, to achieve a specific link quality or target SIR is:

$$L_{max\ dB} = P_{t\ dB} - S_{R\ dB} \quad \text{Eq. (5)}$$

In one embodiment, since the AP1 and RT1 are in a TDMA/TDD communication system, the interferers in cell 104, e.g., AP2, RT5 and RT6 do not all transmit at the same time. Therefore, each transmission in cell 104 causes partial interference in a fraction of downlink transmission 112 in cell 102. Let $\alpha_{ij} \in \{0,1\}$-valued random variable, which indicates that whether at the time of SIR measurement at receiver i (e.g., RT1) in cell 102, the transmitter with power $P_j$ in cell 104 affects the receiver i in cell 102. Cleary $\alpha_{ij}=1$ and therefore, the power received at receiver i from transmitter j is $$P_{ij} = \alpha_{ij} G_{ij} P_j, \quad \alpha_{ij} \in \{0,1\} \quad \text{Eq. (6)}$$

Now, the SIR for receiver i (e.g., RT1), denoted by $\gamma_i$, is $$\gamma_i(P) = \frac{G_{ii} p_i}{\sum_{i \neq j} \alpha_{ij} G_{ij} p_j + N_i} = \frac{G_{ii} p_i}{I_i} \quad \text{Eq. (7)}$$

where $P = [p_1, p_2, \ldots P_N]$, is the power vector and $N_i$ is thermal noise at receiver i, and $$I_i = \sum_{i \neq j} \alpha_{ij} G_{ij} p_j + N_i,$$

is the total noise-plus-interference at receiver i. From Eq. (7), one can clearly see that in dynamic TDMA systems, the interference pattern can fluctuate more rapidly because of $\alpha_{ij}$ factors. Thus, the co-channel interference in cell 102 of the system of FIG. 1, for example, generated by the terminals of cell 104, causes fluctuations in the channel conditions as seen by the terminals of cell 102.

It is also noted that although the problem of co-channel interference is presented in terms of downlink transmissions from AP1 to RT1, the same problem occurs for uplink transmissions from RT1 to AP1 such that the terminals of cell 104 potentially cause interference at AP1 for the signaling received from RT1.

According to several embodiments of the invention, a rate and power control algorithm is provided to reduce interference to an acceptable level at the receiver in a wireless communication system. Thus, the communication terminals, i.e., the access point and the remote terminals, of the communication system 100 support multiple data rates and multiple power levels. In some embodiments, the rate and power control algorithm is adapted for a communication system 100 in which the remote terminals support traffic with different quality of service (QoS) requirements, e.g., voice, data, and video traffic. Furthermore, in some embodiments, the rate and power control algorithm is a distributed algorithm that is performed, for example, at each access point within the communication system 100 with only local measurements without specific knowledge of the link gains (channel conditions) in other cells in the system, independently rather than performed at a central controller for the communication system 100. The rate and power control algorithms of several embodiments also provide an added benefit in that power is conserved in the remote terminals.

Figure 2:
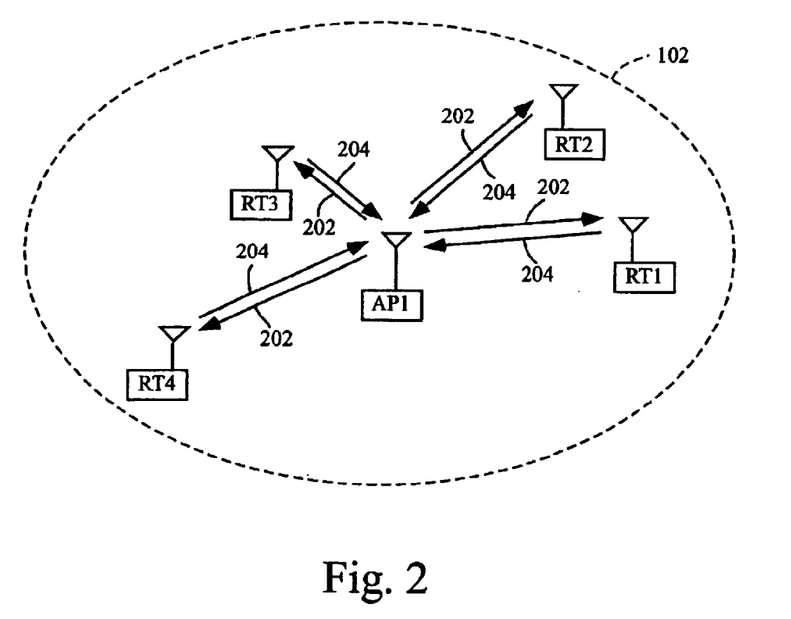
FIG. 2 is a diagram illustrating one embodiment of a single cell of the communication system of FIG. 1.

Referring next to FIG. 2, a diagram is shown illustrating one embodiment of a single cell of the communication system of FIG. 1. In this embodiment, the cell 102 includes access point 1 (AP1) and remote terminals 1, 2, 3 and 4 (RT1, RT2, RT3 and RT4). AP1 may generically be referred to as a communication terminal or a communication transceiver and includes a transmitter and receiver. Similarly, RT1, RT2, RT3 and RT4 may generically be referred to as remote communication terminals or remote transceivers, each including a transmitter and a receiver. The communication terminals of FIG. 2, e.g., AP1, RT1, RT2, RT3 and RT4, are configured to support multiple data rates (also referred to as physical (PHY) modes), i.e., support multiple modulations such as M-QAM constellations. FIG. 2 also illustrates the forward channel 202 and the reverse channel 204 established between AP1 and each of RT1, RT2, RT3 and RT4. The forward channels 202 are also referred to as the downlink and the reverse channels 204 are also referred to as the uplink.

According to several embodiments of the invention, a rate and power control algorithm is provided that adaptively controls the rate and power used by each transmitter (e.g., RT1, RT2, RT3 and RT4) for communications with the receiver (e.g. AP1). In preferred embodiments, the rate and power control algorithm is a distributed algorithm in that the algorithm is performed at the access point (AP1) of the cell 102, rather than at a central controller for the entire communication system including other cells, e.g., cell 104 of FIG. 1. Thus, based upon signaling received at AP1 and local measurements taken at AP1, AP1 determines at what power level and rate each remote terminal should use for subsequent signaling back to the access point. Thus, in preferred embodiments, the access point of each cell in the communication system individually attempts to optimize the rate and power for signaling transmitted from each remote terminal within the cell to the access point depending upon the channel conditions. Thus, the rate and power control algorithm of several embodiments of the invention is performed locally within each cell without specific knowledge of the transmission activities and channel condition measurements in adjacent cells. The overall effect of all co-channel links in the system will be represented in the local SIR measurements, and in some embodiments, this is the only means that each AP uses to learn about other APs in the vicinity, as such the rate and power control algorithm is distributed.

It is noted that in alternative embodiments, the rate and power control algorithm may be centralized and performed in a central controller coupled to all cells in the system. In these alternate embodiments, local measurements of the channel conditions for the received signaling at each access point (e.g., AP1 and AP2) are sent to the central controller. The central controller then determines what rate and power each remote terminal should use in each cell in order to carry out the rate and power control algorithm and transmits the rate and power back to the terminals of each cell. However, in comparison to a distributed algorithm, the centralized rate and power control algorithm takes up valuable bandwidth in receiving local measurements and transmitting the rate and power updates back to the respective cells of the system.

As illustrated in FIG. 1, it is seen that the channel conditions on the respective forward channels, as well as reverse channels, will fluctuate due to interference from terminals in neighboring cells and also due to changes in the multipath. In embodiments communicating using a TDMA/TDD frame structure, fluctuations in the channel conditions due to interference are increased. In preferred embodiments, the cell 102 of FIG. 2 represents a wireless indoor (or indoor/outdoor) local area network using orthogonal frequency divisional multiplexed (OFDM) communications based on the IEEE 802.11a standard or the HiperLAN2 standard. However, it is noted that the rate and power control algorithms of several embodiments of the invention may be applied in communication systems utilizing a single carrier or a multicarrier (one example of which is OFDM) transmission scheme. In some embodiments, the communication system 100 is a residential wireless network in which the access point is to another computer network, for example, a cable or satellite interface to an Internet, while the remote terminals comprise computers (PCs), laptops, televisions, stereos, appliances, palm devices, appliances, etc. In other embodiments, the communication system 100 comprises a wireless local area network in an office or business in which the access point couples to a larger computer network and the remote terminals comprise other computers, laptops, palm devices, televisions, appliances, etc. In other embodiments, the communication system 100 is a wireless terrestrial cellular network in which the access points comprise base stations and the remote terminals comprise wireless mobile devices. It is noted that in many embodiments, many of the communicating terminals are mobile. It is understood that the rate and power control algorithm of several embodiments of the invention may apply to any wireless communication network, e.g., cellular, satellite, optical, short range, long range, indoor/outdoor, having multi-rate capability in which interference is present and/or channel conditions vary or fluctuate. It is also noted that in many embodiments of the invention, one or more of the remote terminals within each cell support communications having different QoS requirements, i.e., one or more of the remote terminals support different types of traffic, such that the different communications have different requirements in terms of the signal-to-interference ratio (SIR) or signal-to-noise ratio (SNR) required to be achieved at the receiver. For example, each of the remote terminals RT1, RT2, RT3 and RT4 supports one of data, voice, and video traffic, for example.

It is also understood that the rate and power control algorithm of several embodiments of the invention may be used between any two communicating devices, without requiring that such devices be a part of a network or a cell. Thus, the rate and power control algorithm may be used in a system having two transceivers supporting multiple rates with forward and reverse channels established there between. Furthermore, it is understood that the rate and power control algorithm of several embodiments may be used between a transmitter-receiver pair supporting multiple data rates, as long as there is a reverse channel of some type established between the transmitter and the receiver to transmit rate update signals in any known form back to the transmitter.

Generally, in a communication system, the user throughput is a function of the signal-to-interference ratio (SIR) at a receiver and the modulation scheme used at a transmitter communicating with the receiver and may be defined as the number of bits that can be transmitted successfully to the receiver within each transmitted symbol. The SIR at a given receiver in the system is a function of the transmit power of all other users in the system. The transmit powers of unwanted users (e.g., AP2, RT5 and RT6 in FIG. 1) cause interference and potentially can reduce the SIR for the desired user.

By employing distributed power control techniques, this interference can be minimized or reduced to an acceptable level. Furthermore, by applying rate control algorithms using adaptive modulation, the throughput of the system may be improved. Even further, power control algorithms will conserve power at the remote terminals, e.g., a battery powered remote terminal will have a longer battery life.

Another way to optimize throughput is to use adaptive bit loading or adaptive modulation at a modulator of the transmitter to change the number of bits assigned to a carrier as channel conditions change. Thus, generally speaking, in order to maximize the throughput between the transmitter and the receiver, and minimize the effect of co-channel interference and other interference while at the same time conserving power (e.g., battery power) of a remote terminal, it is desired to transmit signaling at the highest rate and the lowest power that will meet the required target SIR assigned to a given terminal.

In any practical communication system, the number of bits transmitted within each symbol is restricted to a finite number of values. For example, when using an M-QAM modulation scheme, the constellation size is restricted to $M_j=2^j$, j=1, 2, . . . , J, making the bits per symbol equal to one of a small set of values. For the M-QAM modulation scheme, the throughput (spectral efficiency) is defined in terms of bits/Hz/subcarrier as follows:

$$T_j(\gamma)=(1-p_{b,j}(\gamma))log_2(M_j) \quad \text{Eq. (8)}$$

where $0 \leq p_{b,j} \leq 1$ is the uncoded BER (i.e., the BER at the output of a demodulator of the receiver) associated with $j^{th}$ QAM constellation, $\gamma$ is the SIR of the received signal and M is the constellation size. In the ideal case, it follows that:

$$2^b - 1 = \frac{S}{N} \quad \text{Eq. (9)}$$

which means that each extra bit, i.e. doubling constellation size, requires a 3 dB increase in SNR (doubling the SNR in the linear scale). For example, BPSK requires about 3 dB, QPSK requires about 6 dB, 16-QAM requires about 12 dB, and 64-QAM requires about 18 dB.

Thus, according to several embodiments of the invention, a required target channel condition metric, e.g., a target SIR or a target SNR, is assigned for each transmitter (e.g., each remote terminal) communicating with a receiver (e.g., each access point). The required target channel condition metric is to be met at the receiver for signaling from each transmitter and is a function of the type of service (ToS) for the signaling from each transmitter. Next, a signal or communication burst is transmitted, e.g., in a media access control (MAC) frame, from a transmitter (e.g., RT1) to a receiver (e.g., AP1). The receiver determines a measurement of the channel conditions, or a channel condition metric from signaling received from the transmitter of each terminal. The receiver also measures the received signal strength (RSS) and performs error detection on the received signaling from each terminal. At this point, the receiver makes appropriate adjustments to the target channel condition metric assigned to one or more of the communicating terminals, e.g., based upon the measured RSS and/or the results of the error detection. Once the target channel condition metric is adjusted, if needed, then the rate and power control algorithm determines the maximum transmit power and rate to be used for a subsequent signal to be transmitted by each transmitter to the receiver. Once the maximum transmit power and rate are determined, they are forwarded back to each transmitter via a feedback channel (e.g., via the downlink channel back to each remote terminal).

This algorithm is in contrast to known power control algorithms in that adjustments may be made to the target channel condition metric. In known systems, such as the SIR balancing approach, a fixed target SIR or a fixed target SNR for all links is required to be met at the receiver. Then the power control algorithm chooses the best transmit power and rate in an attempt to meet this fixed target SIR or SNR for all links. By providing adjustments to the fixed channel condition metric that must be met at the receiver, the rate and power control algorithm of several embodiments of the invention avoids the problem of instability in the system. Furthermore, the SIR balancing approach is employed in a system that has no QoS requirement. In other words, all communications in the system are of the same type of service, i.e., all voice or all data communications; thus, all communications for all terminals must meet the same fixed target SIR. In contrast, the rate and power control algorithms of several embodiments of the invention are applied in a system having traffic with different QoS requirements; thus, there may be more than a different target channel condition metric that is required to be met for signaling received at the receiver from different terminals.

Figure 3:
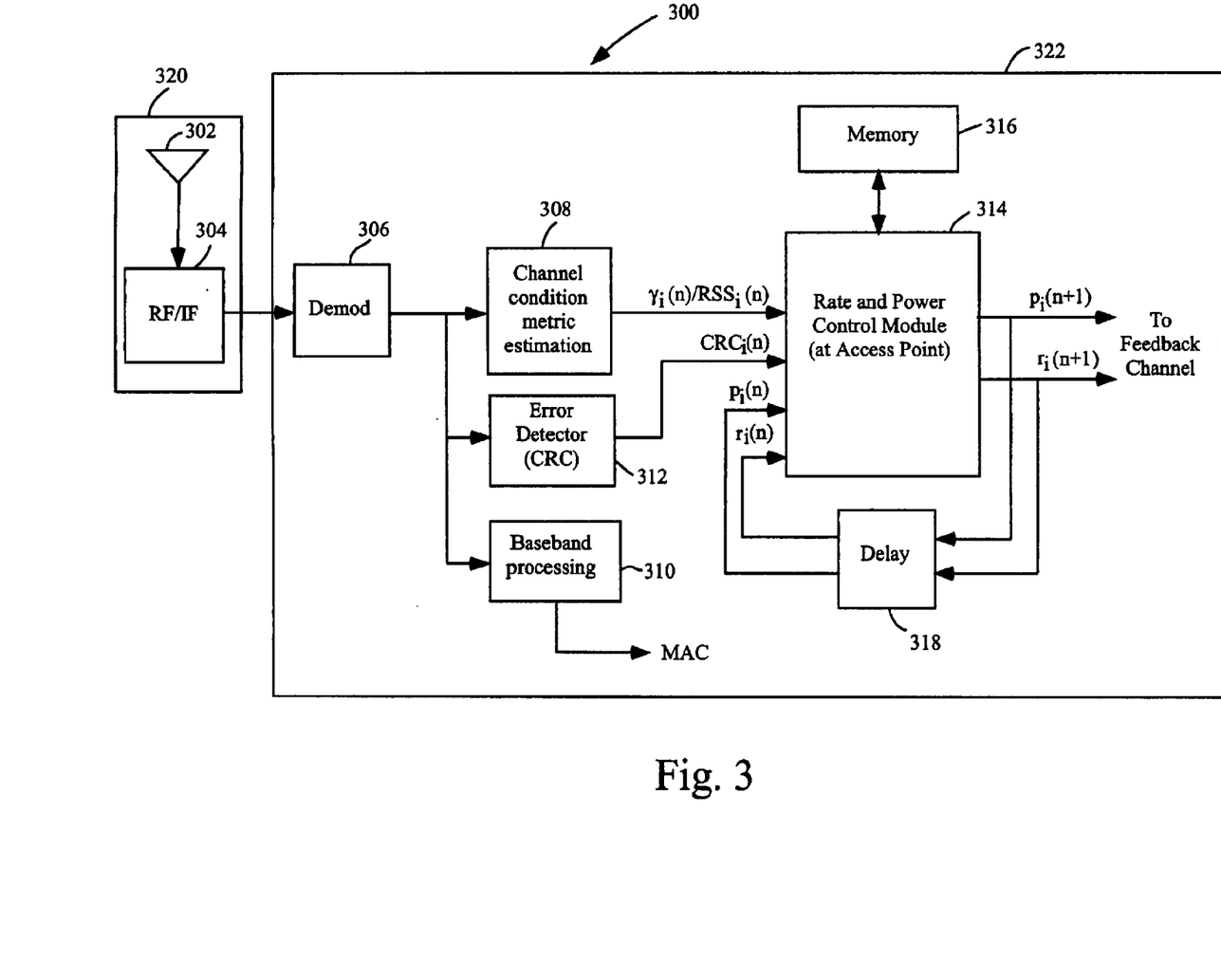
FIG. 3 is a functional block diagram of several components of an access point of the cell of FIG. 2, which according to several embodiments of the invention, implements a distributed rate and power control algorithm for uplink communications from the various remote terminals to the access point.

Referring next to FIG. 3, a functional block diagram is shown of several components of an access point of the cell of FIG. 2, which according to several embodiments of the invention, implements a distributed rate and power control algorithm for uplink communications from the various remote terminals to the access point.

While referring to FIG. 3, concurrent reference will be made to FIG. 4, which is a flowchart illustrating the steps performed by the access point of FIGS. 2 and 3 in implementing the distributed rate and power control algorithm for uplink communications to the remote terminals to the access point according to one embodiment of the invention.

Shown in FIG. 3 is a receiver 300 including an antenna 302, a radio frequency/intermediate frequency portion 304 (hereinafter referred to as the RF/IF portion 304), a demodulator 306, a channel condition metric estimation 308, a baseband processing portion 310, an error detection module 312, a rate and power control module 314, a memory 316 and a delay 318. Also illustrated is an RF/IF integrated circuit device 320 (also referred to as the RF/IF IC device 320) including the antenna 302 and the RF/IF portion 304 coupled to a baseband integrated circuit device 322 (also referred to as the baseband IC device 322) including the demodulator 306, the channel condition metric estimation 308, the baseband processing portion 310, the error detection module 312, the rate and power control module 314, the memory 316 and the delay 318.

According to several embodiments of the invention, the transmitters (e.g., RT1, RT2, RT3 and RT4) that communicate with the receiver 300 (e.g., AP1) all support multiple data rate communications at multiple transmit power levels. Thus, the receiver 300 performs a rate and power control algorithm for one or more terminals that communicate with the receiver. Thus, all terminals in the communication system are capable of transmitting packets to the receiver with different bit rates, $R_1 < R_2 < \ldots < R_J$, $R_j = \log_2(M_j)$, and $M_j = 2^j$, $j=1, 2, \ldots, J$, for example using an M-QAM modulation scheme (e.g., BPSK, QPSK, 16-QAM, 64-QAM, etc.). Furthermore, it is understood that the communications may be transmitted according to any known single carrier or multicarrier modulation.

Figure 4:
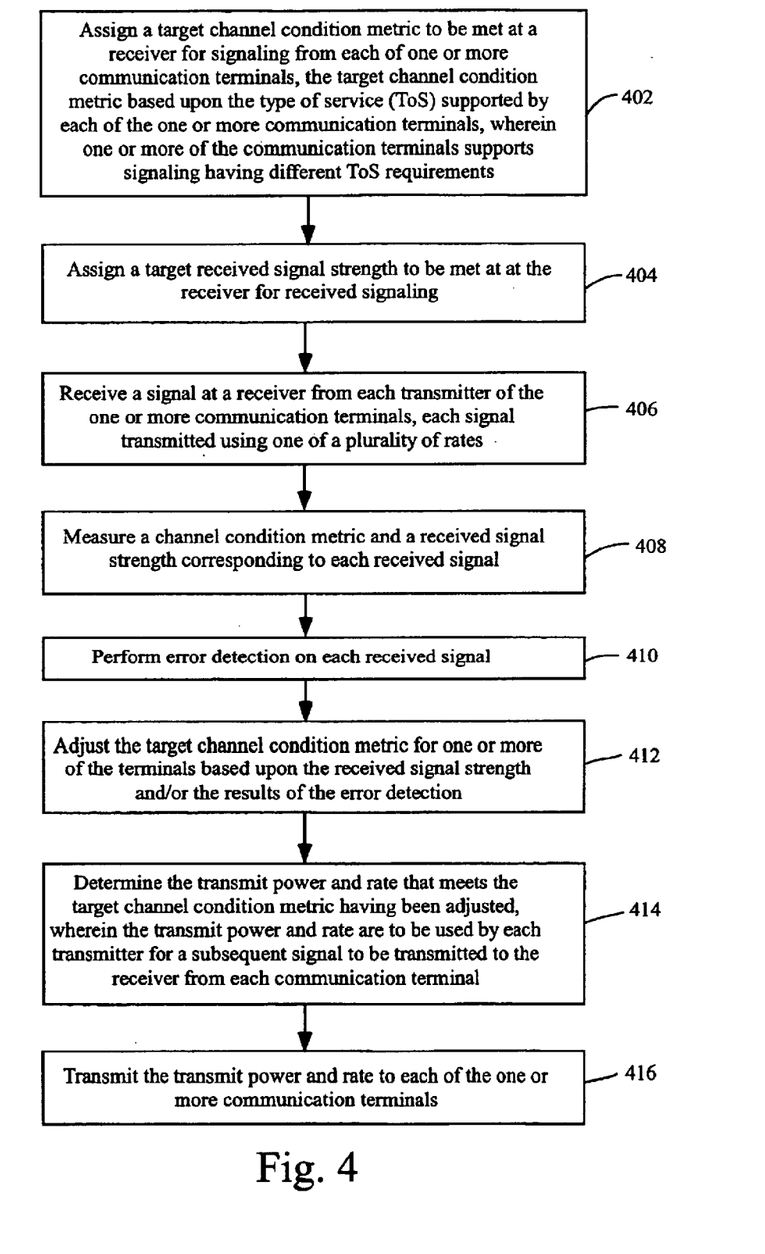
FIG. 4 is a flowchart illustrating the steps performed by the access point of FIGS. 2 and 3 in implementing the distributed rate and power control algorithm for uplink communications from the remote terminals to the access point according to one embodiment of the invention.

Initially, since the communication system supports communications having different types of service, such as, voice, video and data, each terminal communicating with the receiver 300 is assigned a target channel condition metric (i.e., $\gamma_t$) that is to be met at the receiver 300 (Step 402 of FIG. 4). The target channel condition metric is a threshold channel condition metric for each terminal (e.g., RT1, RT2, RT3 and RT4) and is based upon the type of service that each respective terminal supports. For example, the target channel condition metric $\gamma_t$ for a terminal communicating voice signaling will have a different target channel condition metric than a terminal supporting data signaling. In one embodiment, the target channel condition metric is a target SIR measured in dB. For example, a terminal supporting voice communications may be assigned a target SIR at the receiver 300 of 6 dB, while a terminal supporting data communications may be assigned a target SIR at the receiver of 12 dB, while a terminal supporting video communications may be assigned a target SIR at the receiver of 16–20 dB. It is noted that other suitable channel condition metrics, such as a target SNR or a target distortion level may be defined in other embodiments.

Furthermore, in some embodiments, the assigned target channel condition metric is one of a plurality of target channel condition metric levels. In such embodiments, there are several available target channel condition metrics for a given terminal and initially, one of the available target channel condition metrics is chosen as the assigned target channel condition metric. In preferred embodiments, the assigned target channel condition metric is the highest achievable target channel condition metric of the pluarlity of available target channel condition metrics.

Furthermore, initially, a target received signal strength, i.e., $RSS_t$, to be met at the receiver 300 is also assigned for the receiver 300 (Step 404 of FIG. 4). The target RSS may also be referred to as a threshold RSS and is a function of the analog front end performance of the receiver. Every terminal in the system is assigned a target received signal strength which depends on the performance tolerations of the receiver of each terminal. In one embodiment, the target RSS is measured in dB.

In operation, the antenna 302 (e.g., at AP1) receives communications from a transmitter (e.g., RT1) over a channel (e.g., reverse channel 202) and couples to the RF/IF portion 304. Thus, a signal (e.g., a signal or burst transmitted within a medium access control (MAC) frame) is received from a given transmitter for each of the one or more i terminals (Step 406 of FIG. 4), each signal being transmitted using one of the available rates. It is noted that the received signal may be any communication burst from one or more transmitters. In some embodiments, the signal comprises a portion of a burst or burst transmitted within a MAC frame, one or more MAC frames, or other communication burst from a transmitter that is not part of a MAC frame structure or is asynchronously transmitted. It is noted that the channel conditions, e.g., the SIR of each received signal at the receiver is subject to fluctuations due to a variable amount of co-channel interference and changes in the wireless channel characteristics.

The signaling is downconverted from RF to IF and from IF to baseband at the RF/IF portion 304. Next, each signal is processed at the demodulator 306. It is noted that in preferred embodiments, each signal received is an OFDM signal, such that the demodulator 306 includes a fast Fourier transform (FFT). The demodulated signal is then forwarded to the baseband processing portion 310 which outputs to the MAC layer.

In parallel to the baseband processing, a measured channel condition metric $\gamma_i(n)$ and a measured received signal strength ($RSS_i(n)$) corresponding to each received signal from each transmitter of the i terminals are obtained at the channel condition metric estimation 308 (Step 408 of FIG. 4). In one embodiment, the measured channel condition metric comprises a signal-to-interference ratio (SIR) of the signal received over the channel from the transmitter at the channel condition metric estimation 308; however, it is understood that other metrics reflecting the channel conditions may be performed, such as measuring the signal-to-noise ratio (SNR) or distortion level of the received signal. It is also noted that the $RSS_i(n)$ is measured using any known technique. In the case of a multicarrier signal, such as an OFDM signal, the measured channel condition metric $\gamma_i(n)$, e.g., $SIR_i(n)$, and the $RSS_i(n)$ are measured as an aggregate or average over the multiple subcarriers of the multicarrier waveform, where i is the terminal index. The outputs of the channel condition metric estimation 308 are input to the rate and power control module 314, illustrated in FIG. 3 as $\gamma_i(n)$ and $RSS_i(n)$, where the index i is the terminal index or link index. For example, i=1 corresponds to the signaling received from RT1, i=2 corresponds to the signaling received from RT2, etc. Also, the index n represents the iteration count of the rate and power algorithm, n corresponding to the current iteration and n+1 corresponding to the next iteration. The channel condition metric estimation 308 process may be performed according to any well known techniques in the art. It is noted that although the channel condition metric estimation 308 is taken at baseband in this embodiment, in other embodiments the channel condition metric estimation 308 could occur at IF, as is well known in the art.

Also, in a parallel path to the channel condition metric estimation and baseband processing, error detection is performed on each received signal from each terminal at the error detector 312 (Step 410 of FIG. 4). In one embodiment, each transmitter communicating with the receiver 300 adds a cyclic redundancy check (CRC) sequence to the signal. This CRC sequence is compared to the computed CRC sequence in the receiver at the error detector 312 to determine if there are any errors present in the received signal, e.g., to determine if there are errors present in the received frame. The results of the error detection for the $i^{th}$ terminal are output from the error detector 312 and input to the rate and power control module 314 (illustrated as $CRC_i(n)$ in FIG. 3).

In implementing the rate and power control algorithm of several embodiments of the invention, the rate and power control module 314 inputs the measured channel condition metric $\gamma_i(n)$, e.g., $SIR_i(n)$, the measured received signal strength $RSS_i(n)$, the error detection results, e.g., $CRC_i(n)$, and the transmit power level and the rate corresponding to the current signal (to be used by the rate and power control module 314 during iteration n) from the transmitter of the $i^{th}$ remote terminal or link, as was determined by the rate and power control module 314 in the previous iteration and is illustrated in FIG. 3 as $p_i(n)$ and $r_i(n)$.

According to several embodiments of the invention, the rate and power control module 314 employs a combined channel condition metric based (e.g., SIR-based) and strength-based (e.g., RSS-based) power control algorithm where the assigned target channel condition metrics for one or more of the terminals are adjusted adaptively.

Next, the target channel condition metric for one or more of the terminals is adjusted based upon the measured received signal strength and the measured channel condition metric and/or based upon the results of the error detection (Step 412 of FIG. 4). This is in contrast to known SIR balancing approaches that simply attempt to meet a fixed target SIR that does not change. The concept of adjusting the target channel condition metric is discussed further below with reference to FIGS. 5 and 6. In one embodiment, this adjustment occurs at the rate and power control module 314. It is noted that the target channel condition metric is adaptively adjustable, but does not have to be adjusted every iteration of the rate and power control algorithm or adjusted at all depending on the channel conditions. As mentioned above, in some embodiments, the assigned target channel condition metric for each terminal is one of a plurality of available target channel condition metrics for that terminal, preferrably a highest achievable one of the available target channel condition metrics.

Next, once the target channel condition metric is adjusted, then the transmit power and rate for each terminal that meet the target channel condition metric having been adjusted for each terminal are determined, wherein a respective transmit power and rate are to be used by a respective transmitter for a subsequent signal (e.g., burst within a MAC frame) to be transmitted to the receiver from the respective communication terminal (Step 414 of FIG. 4). The transmit power and rate for the subsequent signal for the $i^{th}$ terminal are illustrated as $p_i(n+1)$ and $r_i(n+1)$ at the output of the rate and power control module 314 of FIG. 3. Further details regarding this determination are described below with reference to FIG. 6.

Once the transmit power and rate are determined for the subsequent signal to be transmitted by each transmitter to the receiver, the transmit power $p_i(n+1)$ and the rate $r_i(n+1)$ for each terminal are transmitted back to the transmitter of each terminal (Step 416 of FIG. 4), e.g., via a respective feedback channel.

It is noted that upon completion of Step 416 of FIG. 4, the process starts again at Step 406 and Steps 406 through 416 are repeated in another iteration of the rate and power control algorithm. It is also noted that in many embodiments, the power and rate are updated once per MAC frame; however, it is understood that in other embodiments, power and rate transmission levels may be updated less frequently. In other embodiments, the rate and power may be updated for signaling transmitted from one or more remote terminals that are not part of a MAC frame structure at intervals convenient to the transmission scheme of the system.

It is noted that many of the functional blocks of the receiver of FIG. 3 may be implemented as a set of instructions that are performed in dedicated hardware, firmware or in software using a processor or other machine to execute the instructions to accomplish the provided functionality. For example, in one embodiment, the receiver 300 of FIG. 3 may be implemented as one or more integrated circuit (IC) devices. For example, in one embodiment, the antenna 302 and RF/IF portion 304 are implemented on the RF/IF IC device 320, while the remaining functional components of the receiver, including the rate and power control module 314 are implemented on the baseband IC device 322, which is coupled to the RF/IF IC device. These integrated circuit devices 320 and 322 may be referred to application specific integrated circuits (ASICs) or generically as chips. Alternatively, the RF/IF IC device 320 and the baseband IC device 322 may be implemented as a single chip or ASIC. Thus, the RF/IF IC device 320 and the baseband IC may be a part of a chipset or a single chip or ASIC designed to implement the function blocks of the receiver 300. Similarly, the steps of FIG. 4 (particularly Steps 412 and 414 of FIG. 4) may be performed as a set of instructions that are performed in dedicated hardware, firmware or in software using a processor or other machine to execute the instructions to accomplish the given steps.

Figure 5:
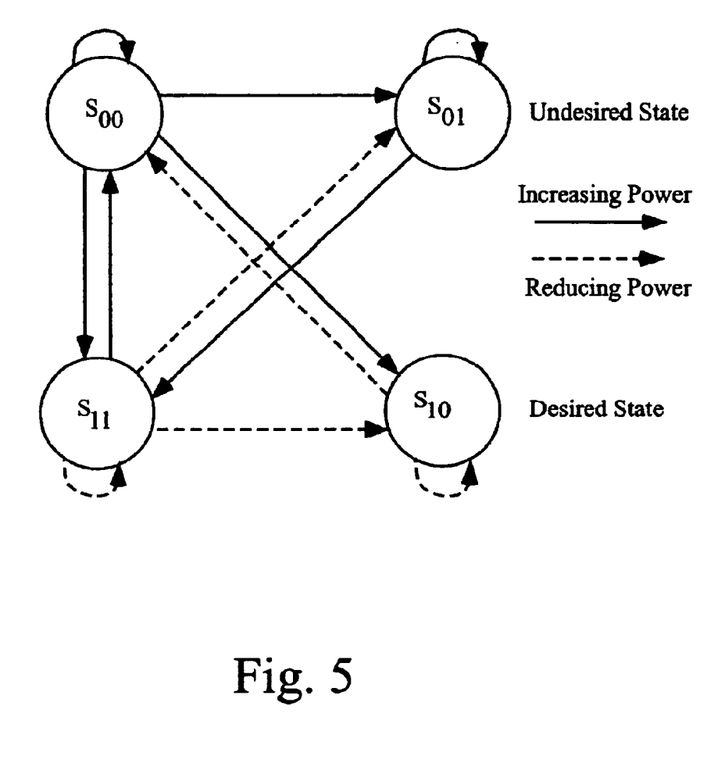
FIG. 5 is a state transition diagram illustrating a combined channel condition metric and received signal strength (RSS) based power control algorithm according to one embodiment of the invention.

Briefly referring next to FIG. 5, a state transition diagram is shown illustrating a combined channel condition metric, e.g., SIR, and received signal strength (RSS) based power control algorithm according to one embodiment of the invention. Let $[s_0 s_1]$ denote the state of the power control algorithm, where $s_0$ and $s_1$ are defined as follows $$s_0(n) = \begin{cases} 1 & \gamma_i(n) \geq \gamma_t \\ 0 & \gamma_i(n) < \gamma_t \end{cases} \qquad \text{Eq. (10)}$$

and $$s_1(n) = \begin{cases} 1 & RSS_i(n) \geq RSS_t \\ 0 & RSS_i(n) < RSS_t \end{cases} \qquad \text{Eq. (11)}$$

where $\gamma_t$ and $RSS_T$ are the target channel condition metric and the target signal strength, respectively, and $\gamma_i(n)$ and $RSS_i(n)$ are the measured channel condition metric and the measured signal strength during the $n^{th}$ MAC frame or nth iteration of the algorithm, respectively, for a signal received from the $i^{th}$ terminal or link at the receiver 300. In general, the power control algorithm starts with the assigned target channel condition metric for each terminal, i.e., target SIR, and updates the transmit powers for each terminal for a number of iterations in an attempt to meet the target channel condition metric assigned to each terminal. Again, it is noted that in some embodiments, the assigned target channel condition metric is one of, preferrably the highest achievable target channel condition metric out of, a plurality of available target channel condition metrics. If the transmit power required to achieve this assigned target channel condition metric grows too high (hits the maximum transmit power of the device(s) communicating with the receiver, i.e., $p_{max}$) or the target channel condition metric is not achieved in a number of iterations even though the measured $RSS_i(n)$ is beyond its threshold, the assigned target channel condition metric for the particular terminal is reduced, for example, the target SIR is reduced as much as δ dB. Then, the power control algorithm is attempted again until the transmit power updates converge or it is concluded that there is no feasible solution for the current system load.

In FIG. 5, it is seen that the desired state is $s_{10}$ where the target channel condition metric $\gamma_t$, e.g., target $SIR_t$, is achieved and the measured $RSS_i(n)$ is below the threshold $RSS_t$. On the other hand, the undesired state is $s_{01}$ where the target channel condition metric $\gamma_t$ is not achieved and the measured $RSS_i(n)$ is above the threshold $RSS_t$. Since in this undesired state, the target channel condition metric $\gamma_t$ has not been achieved yet, the power control mechanism will attempt to increase the transmit power to achieve that level, until it hits the maximum transmit power of the given transmitter.

Therefore, when $RSS_i(n) > RSS_t$, the selected target channel condition metric $\gamma_t$ (e.g., selected target SIR) for signaling from the $i^{th}$ terminal is too high. Thus, the target channel condition metric $\gamma_t$ is reduced so the power control loop becomes stable again. If the algorithm had not been designed to adaptively adjust the target SIR, like the known fixed SIR-balancing approach, the system would have returned to the undesired state and the transmit power would hit its maximum. Thus, in contrast to known power control algorithms, the target channel condition metric $\gamma_t$ is adjustable at the receiver by the rate and power control module 314. As described above and according to several embodiments, the measured $RSS_i(n)$ is used to adjust the target channel condition metric $\gamma_t$.

Additionally, in some embodiments, the target channel condition metric $\gamma_t$ assigned to a given transmitter or terminal is adaptively adjusted according to the maximum transmit power of the given transmitter communicating with the receiver. That is, the requested transmit power for the next signal or burst, e.g., transmitted within a MAC frame, (as determined by the rate and power control module 314 must be always less than maximum transmit power, i.e., $p_i(n+1) \leq p_{max}$, at the given transmitter, where $p_{max}$ is the maximum allowable transmit power of the given transmitter and $p_i(n+1)$ is the transmit power determined by the rate and power control module 314 for the next signal (e.g., next transmit MAC frame). It is understood that in many scenarios, $RSS_i < RSS_t$, but the receiver 300 still cannot reach to the target channel condition metric $\gamma_t$ (even if the transmitter sends the packets at the maximum power). Therefore, if the requested transmit power hits the $p_{max}$, it means that for the given channel condition, the target channel condition metric $\gamma_t$ (e.g., given target SIR) corresponding to the $i^{th}$ terminal is too high and it should be reduced.

In further embodiments, the target channel condition metric assigned to a given terminal is adaptively adjusted using the output of the error detector 312 on signals received from the given terminal, e.g., CRC errors provide an indication of whether the target channel condition metric is too low or too high. For example, if there are no CRC errors, the channel is in good condition and the target channel condition metric for the given terminal is increased by a small step. If there are several CRC errors present, the channel is in bad condition and the target channel condition metric for the given terminal is decreased by a larger step, forcing the transmitter reducing its transmission rate.

Figure 6:
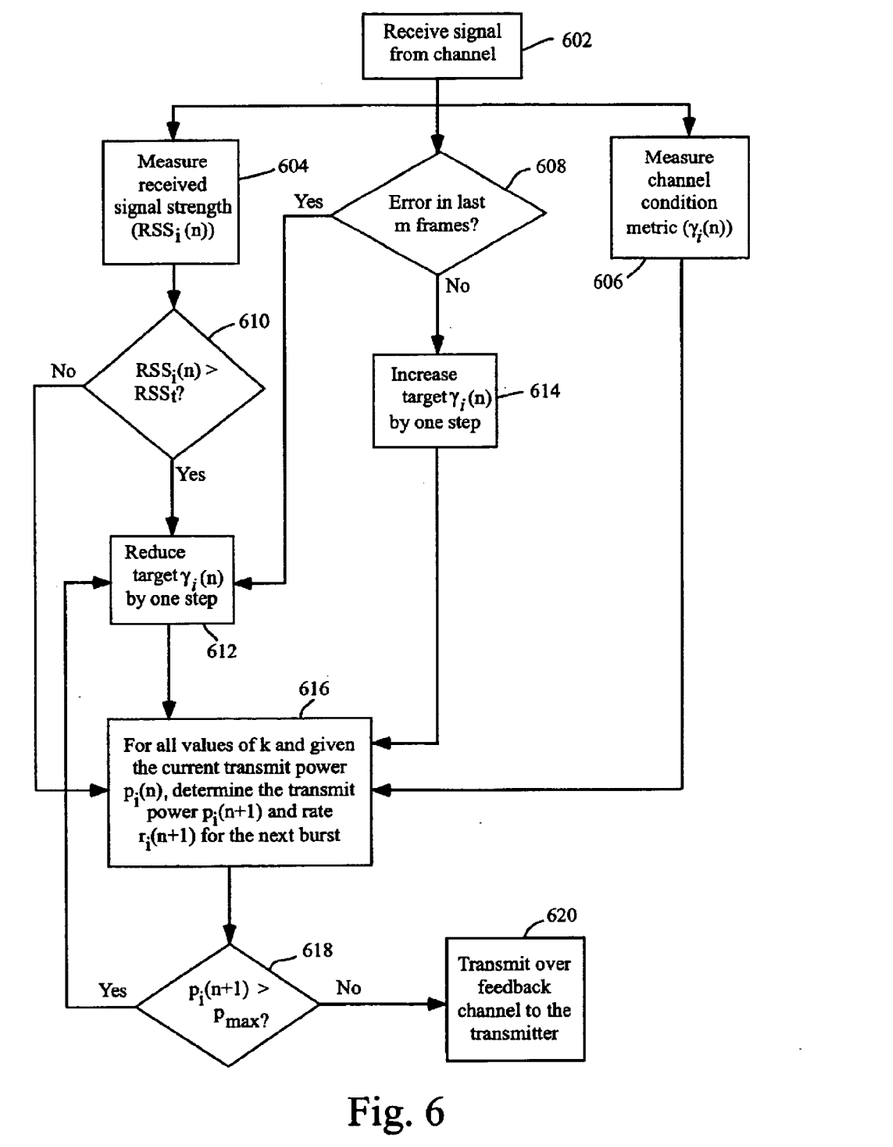
FIG. 6 is a flowchart illustrating one embodiment of the steps performed by the rate and power control module of the access point of FIGS. 2 and 3 when implementing the rate and power control algorithm of several embodiments of the invention.

Referring next to FIG. 6, a flowchart is shown illustrating one embodiment of the steps performed by the rate and power control module of the access point of FIGS. 2 and 3 when implementing the rate and power control algorithm of several embodiments of the invention.

It is generally assumed that for any terminal (RTi, e.g., RT1, RT2, RT3 and RT4) communicating with the receiver (e.g., AP1), that the transmit powers are bounded, e.g., $p_{min} \leq p_i \leq p_{max}$. It is noted that in one embodiment, $p_{min} = -17$ dBm and $p_{max} = 23$ dBm. Also, let $$0 < r_i^1 < r_i^2 < \ldots < r_i^K$$

denote the admissible transmission rates that a given RTi can utilize, where K is the total number of admissible rates or PHY (physical) modes and i is the terminal index or link index. For example, in an M-QAM modulation scheme, signals may be transmitted using BPSK, QPSK, 16-QAM, 64-QAM. Furthermore, each constellation may be encoded differently to effectively produce more admissible rates or PHY modes. For example, a listing of admissible rates may include BPSK, QPSK rate ½, QPSK rate ¾, 16-QAM rate ½, 16-QAM rate ¾, etc., for a total of K admissible rates or PHY modes.

Furthermore, let $$0 < \gamma_i^1 < \gamma_i^2 < \ldots < \gamma_i^K$$

denote the corresponding target channel condition metrics, e.g., target $SIR_t$, for the $i^{th}$ terminal such that a bit stream sent at rate $r_i^k$ (where k is the set of available rates, k=1, 2, 3, ..., K) will be received correctly if the measured channel condition metric for a received signal is larger than or equal to $\gamma_i^k$. Thus, target channel condition metrics for each terminal are assigned for each admissible rate depending on the Type of Service (ToS) of the signaling. Thus, the values of $\gamma_i^k$ represent the plurality of target channel condition metrics available for a given terminal.

Initially, the transmit power $p_i(0) = p_0 < p_{max}$ and the highest supportable rate L for a given link or terminal i during the $n^{th}$ iteration is set to K. Thus, it is initially assumed that the given link (e.g., the uplinks of FIG. 2) are capable of supporting the highest available rate K. As such, initially, in preferred embodiments, the assigned target channel condition metric $\gamma_i^k$ is set to the highest value $\gamma_i^K$.

A signal (e.g., transmitted in a MAC frame) is then received at the receiver from the channel (Step 602). It is noted that signals may be received from a single terminal communicating with the receiver or signals may be received from each of a plurality of terminals communicating with the receiver.

Next, the received signal strength $RSS_i(n)$ is measured (Step 604) and the channel condition metric $\gamma_i(n)$ (e.g., $SIR_i(n)$) is measured (Step 606) for the signal(s) received from the $i^{th}$ terminal during the $n^{th}$ iteration. Additionally, in parallel to Steps 604 and 606, error detection is performed to determine the presence of an error in the last m frames (Step 608) for the signals received from each $i^{th}$ terminal. In one example, the error detection determines if there was an error in the last 5 transmit frames by performing a CRC check as described above.

If the measured $RSS_i(n)$ is greater than the threshold or target $RSS_t$ (Step 610), then the target channel condition metric $\gamma_i^k$ (e.g., target $SIR_t$ and in some embodiments, the highest achievable target channel condition metric) corresponding to the $i^{th}$ terminal is reduced by one step size (Step 612), unless the target channel condition metric for the $i^{th}$ terminal is already at its lowest value. In other words, the current highest supportable rate (PHY mode) L for the channel is reduced by 1, i.e., for L>1⇒L=L−1. Thus, $\gamma_i^k$ is reduced to $\gamma_i^{k-1}$.

Alternatively, if there is an error in the last m frames for signals received from the $i^{th}$ terminal as determined in the error detection process (Step 608), then the target channel condition metric $\gamma_i^k$ (e.g., target $SIR_t$) corresponding to the $i^{th}$ terminal is reduced by one step size (Step 612).

If there are no errors in the last m frames (Step 608) for signals received from the $i^{th}$ terminal, then the target channel condition metric $\gamma_i^k$ (e.g., target $SIR_t$) corresponding to the $i^{th}$ terminal is increased by one step size (Step 614), but only where the current highest supportable rate L is less than the highest admissible rate K. In other words, for L<K=L⇒L+1. Thus, $\gamma_i^k$ is increased to $\gamma_i^{k+1}$ Then, if the measured $RSS_i(n)$ is not greater than the threshold or target $RSS_t$ (Step 610), or upon completion of either reducing the target channel condition metric (Step 612) or increasing the target channel condition metric (Step 614), the rate and power control algorithm determines the minimum transmit power $p_i(n+1)$ to achieve the maximum possible rate $r_i(n+1)$ (which maximizes the throughput) for the next signal to be transmitted from the $i^{th}$ terminal to the receiver for all admissible rates (all values of k) and given the transmit power of the current received signal (Step 616) from the $i^{th}$ terminal.

Mathematically, finding the minimum transmit power $p_i(n+1)$ for the next signal (e.g., burst within a MAC frame) for the $i^{th}$ terminal may be represented as:

$$p_i(n+1) = \max_{k \in \{1 \ldots L\}} \left\{ p_i(n) \frac{\gamma_i^k}{\gamma_i(n)} \middle| \forall k : p_i(n) \frac{\gamma_i^k}{\gamma_i(n)} < p_{\max} \right\} \quad \text{Eq. (12)}$$

where $\gamma_i^k$ is the target channel condition metric (e.g., the target $SIR_t$) corresponding to the $i^{th}$ terminal, $\gamma_i(n)$ is the measured channel condition metric (e.g., the measured $SIR_i$(n)) from the signal received from the $i^{th}$ terminal, $p_i(n)$ is the transmit power of the current signal as determined in the previous iteration of the algorithm, i is the terminal index or link index (e.g., for the $i^{th}$ terminal or RTi (RT1, RT2, etc.)) for which the rate and power updates are being applied, where i=1, 2, 3, . . . , I, where I≧1 and is a total number of terminals, n is the iteration index, k is the rate index, and L is the highest supportable rate for the $i^{th}$ link during the $n^{th}$ iteration.

The iteration index n represents the iteration count of the rate and power algorithm, where n corresponds to the current iteration and n+1 corresponds to the next iteration. Also, the rate index k represents a set of available rates where k=1, 2, 3, . . . , K, where K is the total number of rates or PHY modes supportable by the system. Furthermore, Eq. (12) is maximized for values of k=1, 2, . . . , L, where L may or may not be equal to K (initially, L=K).

Thus, according to Eq. (12), for all possible values of k up to L, the transmit power for the next signal (e.g., burst within a MAC frame) to be transmitted from the $i^{th}$ terminal to the receiver, i.e., $p_i(n+1)$, is determined from the measured channel condition metric (i.e., $\gamma_i(n)$), the target channel condition metric having been adjusted (i.e., $\gamma_i^k$) and the result of the power control algorithm during the previous iteration (i.e., $p_i(n)$) corresponding to the $i^{th}$ terminal. The minimum value of $p_i(n+1)$ that achieves the maximum achievale rate is then selected as the requested transmit power that will be used by the transmitter of the $i^{th}$ terminal in sending the next signal to the receiver.

The requested rate $r_i(n+1)$ or PHY mode for the next signal to be transmitted from the $i^{th}$ terminal is the rate which satisfies the maximization of Eq. (12) and can be expressed mathematically as:

$$r_i(n+1) = \max_{k \in \{1 \ldots L\}} \left\{ r_i^k \middle| p_i(n) \frac{\gamma_i^k}{\gamma_i(n)} < p_{\max} \right\} \quad \text{Eq. (13)}$$

An undesirable effect of determining the rate or PHY mode for the next signal based on Eq. (13) is that when the measured channel condition metric $\gamma_i(n)$ is close to the target channel condition metric $\gamma_i^k$, the PHY mode determination may fluctuate between two modes from iteration to iteration. This "pingpong" effect may be avoided by introducing a hysteresis in the PHY mode determination mechanism. To that end, in some embodiments, the system remembers how long (i.e. how many iterations) it has existed in the current PHY mode. Then if the target channel condition metric $\gamma_i^k$ for the current PHY mode (say mode 'k') is greater than the measured channel condition metric $\gamma_i(n)$, but not by more than a hysteresis threshold $H_\delta$ and the system has been in the current PHY mode for less than $N_H$ iterations, the system will not switch to a lower PHY mode in the current iteration. Likewise if the target channel condition metric $\gamma_i^k$ for the current PHY mode is less than the measured channel condition metric, but by no more than a hysteresis threshold $H_\epsilon$ and the system has been in the current PHY mode for less than $N_H$ iterations, the system will not switch to a higher PHY mode. The hysteresis thresholds $H_\delta$, $H_\epsilon$ and the hysteresis duration $N_H$ will be system parameters to be determined based on an empirical or statistical model of the wireless channel. By way of example, in one embodiment, the hysteresis thresholds $H_\delta$, $H_\epsilon$ may be between 0.5 and 3 dB and the hysteresis duration may be between 3 and 10 iterations.

It is noted that the derivation of relationship within the maximization of Eq. (12) and Eq. (13) is well known in existing power control algorithms, for example, performed in the known SIR balancing techniques. For example, assuming in a communication system that at any given time, each transmitter in the system will not change its transmit power, i.e., that the interference level will remain constant in the system, even though this is not what happens in reality, the transmit power that should be used for the next frame by a given transmitter of the $i^{th}$ terminal is given by:

$$p_i(n+1) = p_i(n) \frac{\gamma_i^k}{\gamma_i(n)} \quad \text{Eq. (14)}$$

This relationship is described in G. J. Foschini, "A Simple Distributed Autonomous Power Control Algorithm and its Convergence," IEEE Trans. Vehicular Technol., vol. 42, No. 4, Nov. 1993, pp 641–646, which is incorporated herein by reference.

Next, the determined minimum transmit power $p_i(n+1)$ which achieves the maximum rate for the next signal corresponding to the $i^{th}$ terminal is compared with the maximum transmit power $P_{max}$ that the given transmitter can transmit at (Step 618). If $p_i(n+1)$ is not greater than the maximum transmit power $p_{max}$, then the transmit power $p_i(n+1)$ is transmitted back to the given transmitter of the $i^{th}$ terminal via a feedback channel (Step 620) (e.g., one of the forward channels or downlinks in FIG. 2). However, if $p_i(n+1)$ is greater than the maximum transmit power $p_{max}$, then the target channel condition metric $\gamma_i^k$ (e.g., target $SIR_t$) corresponding to the $i^{th}$ terminal is reduced by one step size (Step 612), unless the target channel condition metric is already at its lowest value. In other words, the current highest supportable rate L for the channel is reduced by 1, i.e., for L>1⇒>L=L−1, and Step 616 is performed again until the $p_i(n+1)$ is not greater than the maximum transmit power $p_{max}$ (Step 618).

Thus, in general and according to one embodiment, the rate and power algorithm starts with the highest target channel condition metric (highest target SIR) for each terminal or link and updates the transmit powers of that terminal or link for a number of iterations. If the power required to achieve the highest achievable target channel condition metric grows too high (hits $p_{max}$) or the highest achievable target channel condition metric (e.g., target SIR) is not achieved in a number of iterations even though the RSS is beyond its threshold, the highest achievable target channel condition metric for the particular terminal is dropped as much as δ dB. Then the power control algorithm is attempted again. This process is continued until the power updates converge or it is concluded that there is no feasible solution for the current system load. In the case where there is not feasible solution, the receiver, e.g., AP1 in the system of FIGS. 1 and 2, may decide to drop some less important links.

It is noted that upon completion of Step 620, the process starts again at Step 602 and Steps 604 through 620 are repeated in another iteration of the rate and power control algorithm. It is also noted that in many embodiments, the power and rate are updated once per MAC frame; however, it is understood that in other embodiments, power and rate transmission levels may be updated less frequently or updated independently of a frame structure.

Furthermore, it is noted that the rate and power control algorithm may be centralized in a central controller or distributed in a communication system, for example, performed at the access point of each cell in the system of FIG. 2 without knowledge of the channel conditions in the other cells of the system. In embodiments employing a distributed algorithm, each access point (or other receiver that performs the rate and power control algorithm) assumes that the interference level or channel conditions as measured for a received signal will not change. In reality, this is not true, since each access point is performing an algorithm to update rate and power for its terminals, which will alter the interference or channel conditions measured in subsequent iterations. Thus, assuming that the interference level will not vary, each access point determines the appropriate power and rate for each of its terminals (based on its current local measurements of the channel conditions) to use when communicating with its access point. These power and rate levels will be updated again in subsequent iterations of the rate and power control algorithm until each access point converges to its own optimal solution, if one exists.

It is noted that the steps listed in FIG. 6 generally represent the steps in performing the rate and power control algorithm according to several embodiments of the invention. These steps (particularly Steps 610 through 618 of FIG. 6) may be performed by the rate and power control module 314 of FIG. 3 and/or may be performed as a set of instructions that are performed in dedicated hardware, firmware or in software using a processor or other machine to execute the instructions to accomplish the given steps.

While the invention herein disclosed has been described by means of specific embodiments and applications thereof, numerous modifications and variations could be made thereto by those skilled in the art without departing from the scope of the invention set forth in the claims.

What is claimed is:

1. A method of rate and power control in a communication system comprising:

assigning a target channel condition metric to be met at a first communication terminal for signaling received from each of one or more remote communication terminals of the communication system, each communication terminal supporting a plurality of rates and a plurality of transmit power levels, each target channel condition metric based upon the type of service supported by each of the one or more remote communication terminals;

receiving a signal at the first communication terminal from each of the one or more remote communication terminals;

adjusting a respective target channel condition metric assigned for a respective one of the one or more remote communication terminals in response to signal information generated from the received signal from the respective one of the one or more remote communication terminals; and determining a respective transmit power level and a respective rate that will satisfy the target channel condition metric for each of the one or more remote communication terminals, the respective transmit power and the respective rate to be used by a respective one of the one or more remote communication terminals for a respective subsequent signal to be transmitted from the respective one of the one or more remote communication terminals to the first communication terminal;

wherein a respective signal received from a respective one of the one or more remote communication terminals was transmitted using a respective one of the plurality of rates and wherein the respective rate that satisfies a respective target channel condition metric comprises a different one of the plurality of rates, the method further comprising:

measuring a channel condition metric corresponding to each received signal; and setting the respective rate to the respective one of the plurality of rates rather than the different one of the plurality of rates, in the event the measured channel condition metric for the respective received signal is within a hysteresis threshold of the target channel condition metric and in the event the system has been transmitting using the respective one of the plurality of rates for less than a specified number of iterations of the receiving and determining steps.

2. The method of claim 1 further comprising transmitting the respective transmit power level and the respective rate for each of the one or more remote communication terminals to the respective one of the one or more remote communication terminals.

3. The method of claim 1 wherein the adjusting step comprises reducing the respective target channel condition metric assigned for the respective one of the one or more remote communication terminals in the event the respective transmit power level exceeds a maximum transmit power of the respective one of the one or more remote communication terminals.

4. The method of claim 1 wherein the adjusting and determining steps are performed at the first communication terminal, wherein the first communication terminal and the one or more remote communication terminals comprise a cell within a communication system comprising a plurality of cells, the adjusting and determining steps performed independent of rate and power adjustments made in others of the plurality of cells in the communication system, wherein a distributed rate and power control algorithm is provided.

5. The method of claim 1 wherein the adjusting comprises adjusting the respective target channel condition metric in response to the signal information generated from the received signal from the respective one of the one or more remote communication terminals, the signal information comprising one or more of a group consisting of: a measured channel condition metric corresponding to the received signal, a measured received signal strength of the received signal, and the results of an error detection process performed on the received signal.

6. The method of claim 1 wherein the adjusting step comprises reducing the respective target channel condition metric in the event a measured received signal strength of the received signal from the respective one of the one or more remote communication terminals exceeds a threshold received signal strength of the first communication terminal.

7. The method of claim 6 further comprising:
measuring a channel condition metric corresponding to each received signal; and
measuring a received signal strength for each received signal.

8. The method of claim 1 wherein the adjusting step comprises reducing the respective target channel condition metric in the event an error detection process indicates that there is an error in the received signal from the respective one of the one or more remote communication terminals.

9. The method of claim 1 wherein the adjusting step comprises increasing the respective target channel condition metric in the event an error detection process indicates that there are no errors in the received signal from the respective one of the one or more remote communication terminals.

10. The method of at claim 1 wherein at least two of the one or more remote communication terminals supports a different one of a plurality of types of service.

11. A method of rate and power control in a communication system comprising:
assigning a target channel condition metric to be met at a first communication terminal for signaling received from each of one or more remote communication terminals of the communication system, each communication terminal supporting a plurality of rates and a plurality of transmit power levels, each target channel condition metric based upon the type of service supported by each of the one or more remote communication terminals;
receiving a signal at the first communication terminal from each of the one or more remote communication terminals;
adjusting a respective target channel condition metric assigned for a respective one of the one or more remote communication terminals in response to signal information generated from the received signal from the respective one of the one or more remote communication terminals; and
determining a respective transmit power level and a respective rate that will satisfy the target channel condition metric for each of the one or more remote communication terminals, the respective transmit power and the respective rate to be used by a respective one of the one or more remote communication terminals for a respective subsequent signal to be transmitted from the respective one of the one or more remote communication terminals to the first communication terminal;

wherein the determining step comprises solving, for each of the one or more remote communication terminals, the following equations for the respective transmit power level $p_i(n+1)$ and the respective rate $r_i(n+1)$ to be used by the respective one of the one or more remote communication terminals for the respective subsequent signal to be transmitted from the respective one of the one or more remote communication terminals to the first communication terminal:

$$p_i(n+1) = \max_{k \in \{1 \ldots L\}} \left\{ p_i(n) \frac{\gamma_i^k}{\gamma_i(n)} \,\middle|\, \forall k : p_i(n) \frac{\gamma_i^k}{\gamma_i(n)} < p_{\max} \right\}$$

and $$r_i(n+1) = \max_{k \in \{1 \ldots L\}} \left\{ r_i^k \,\middle|\, p_i(n) \frac{\gamma_i^k}{\gamma_i(n)} < p_{\max} \right\}$$

where $\gamma_i^k$ is the target channel condition metric for a given remote communication terminal, $\gamma_i(n)$ is the measured channel condition metric for a signal received from the given remote communication terminal, $p_i(n)$ is a transmit power level of the received signal from the given remote communication terminal, i is a terminal index of the one or more remote communication terminals, where i=1,2,3, . . . , I, where I≧1 and is a total number of the one or more remote communication terminals, k is a rate index where k=1, 2, 3, . . . , K, where K is a total number of the plurality of rates, and L is a highest rate of the plurality of rates supportable during the $n^{th}$ iteration.

12. The method of claim 11 further comprising transmitting the respective transmit power level and the respective rate for each of the one or more remote communication terminals to the respective one of the one or more remote communication terminals.

13. The method of claim 11 wherein the adjusting step comprises reducing the respective target channel condition metric assigned for the respective one of the one or more remote communication terminals in the event the respective transmit power level exceeds a maximum transmit power of the respective one of the one or more remote communication terminals.

14. The method of claim 11 wherein the adjusting and determining steps are performed at the first communication terminal, wherein the first communication terminal and the one or more remote communication terminals comprise a cell within a communication system comprising a plurality of cells, the adjusting and determining steps performed independent of rate and power adjustments made in others of the plurality of cells in the communication system, wherein a distributed rate and power control algorithm is provided.

15. The method of claim 11 wherein the adjusting comprises adjusting the respective target channel condition metric in response to the signal information generated from the received signal from the respective one of the one or more remote communication terminals, the signal information comprising one or more of a group consisting of: a measured channel condition metric corresponding to the received signal, a measured received signal strength of the received signal, and the results of an error detection process performed on the received signal.

16. The method of claim 11 wherein the adjusting step comprises reducing the respective target channel condition metric in the event a measured received signal strength of the received signal from the respective one of the one or more remote communication terminals exceeds a threshold received signal strength of the first communication terminal.

17. The method of claim 16 further comprising:
measuring a channel condition metric corresponding to each received signal; and
measuring a received signal strength for each received signal.

18. The method of claim 11 wherein the adjusting step comprises reducing the respective target channel condition metric in the event an error detection process indicates that there is an error in the received signal from the respective one of the one or more remote communication terminals.

19. The method of claim 11 wherein the adjusting step comprises increasing the respective target channel condition metric in the event an error detection process indicates that there are no errors in the received signal from the respective one of the one or more remote communication terminals.

20. The method of claim 11 wherein at least two of the one or more remote communication terminals supports a different one of a plurality of types of service.

21. A rate and power control device for a communication terminal of a communication system comprising:
a rate and power control module for performing the following steps:
obtaining an assigned target channel condition metric to be met at a first communication terminal for a signal received from each of one or more remote communication terminals, each communication terminal supporting a plurality of rates and a plurality of transmit power levels, the assigned target channel condition metric based upon the type of service supported by each of the one or more remote communication terminals; and
adjusting a respective assigned target channel metric for a respective one of the one or more of remote communication terminals in response to signal information generated from the signal received from the respective one of the one or more remote communication terminals;
wherein the rate and power control module additionally performs the following step:
determining a respective transmit power level and a respective rate that will satisfy the assigned target channel condition metric for each of the one or more remote communication terminals, the respective transmit power and the respective rate to be used by a respective one of the one or more remote communication terminals for a respective subsequent signal to be transmitted from the respective one of the one or more remote communication terminals to the first communication terminal;
wherein the determining step performed by the rate and power control module comprises:
solving, for each of the one or more remote communication terminals, the following equations for the respective transmit power level $p_i(n+1)$ and the respective rate $r_i(n+1)$ to be used by the respective one of the one or more remote communication terminals for the respective subsequent signal to be transmitted from the respective one of the one or more remote communication terminals to the first communication terminal:

$$p_i(n+1) = \max_{k \in \{1...L\}} \left\{ p_i(n) \frac{\gamma_i^k}{\gamma_i(n)} \middle| \forall k : p_i(n) \frac{\gamma_i^k}{\gamma_i(n)} < p_{\max} \right\}$$

and $$r_i(n+1) = \max_{k \in \{1...L\}} \left\{ r_i^k \middle| p_i(n) \frac{\gamma_i^k}{\gamma_i(n)} < p_{\max} \right\}$$

where $\gamma_i^k$ is the target channel condition metric for a given remote communication terminal, $\gamma_i(n)$ is the measured channel condition metric for a signal received from the given remote communication terminal, $p_i(n)$ is a transmit power level of the received signal from the given remote communication terminal, i is a terminal index of the one or more remote communication terminals, where i=1,2,3, . . . , I, where I≧1 and is a total number of the one or more remote communication terminals, k is a rate index where k=1, 2, 3, . . . , K, where K is a total number of the plurality of rates, and L is a highest rate of the plurality of rates supportable during the $n^{th}$ iteration.

22. The device of claim 21 further comprising an integrated circuit device, the rate and power control module implemented within the integrated circuit device.

23. The device of claim 21 further comprising a transmitter coupled to the rate and power control module for transmitting the respective transmit power level and the respective rate for each of the one or more remote communication terminals to the respective one of the one or more remote communication terminals.

24. The device of claim 21 wherein the adjusting step performed by the rate and power control module comprises:
reducing the respective assigned target channel condition metric for the respective one of the one or more remote communication terminals in the event the respective transmit power level exceeds a maximum transmit power of the respective one of the one or more remote communication terminals.

25. The device of claim 21 wherein the adjusting and determining steps performed by the rate and power control module are performed at the first communication terminal, wherein the first communication terminal and the one or more remote communication terminals comprise a cell within a communication system comprising a plurality of cells, wherein the rate and power control module performs the adjusting and determining steps independent of rate and power adjustments made in others of the plurality of cells in the communication system, wherein a distributed rate and power control algorithm is provided.

26. The device of claim 21 further comprising a receiver of the first communication terminal, the rate and power control module coupled to the receiver.

27. The device of claim 21 wherein the adjusting step performed by the rate and power control module comprises:
adjusting the respective assigned target channel condition metric in response to the signal information generated from the received signal from the respective one of the one or more remote communication terminals, the signal information comprising one or more of a group consisting of: a measured channel condition metric corresponding to the received signal, a measured received signal strength of the received signal, and the results of an error detection process performed on the received signal.

28. The device of claim 21 wherein the adjusting step performed by the rate and power control module comprises:
reducing the respective assigned target channel condition metric in the event a measured received signal strength of the received signal from the respective one of the one or more remote communication terminals exceeds a threshold received signal strength of the first communication terminal.

29. The device of claim 28 further comprising:
a channel condition metric estimation module coupled to the rate and power control module for measuring a channel condition metric corresponding to each received signal and for measuring a received signal strength for each received signal.

30. The device of claim 21 wherein the adjusting step performed by the rate and power control module comprises:
reducing the respective assigned target channel condition metric in the event an error detection process indicates that there is an error in the received signal from the respective one of the one or more remote communication terminals.

31. The device of claim 21 wherein the adjusting step performed by the rate and power control module comprises:
increasing the respective assigned target channel condition metric in the event an error detection process indicates that there are no errors in the received signal from the respective one of the one or more remote communication terminals.

32. The device of claim 21 wherein at least two of the one or more remote communication terminals supports a different one of a plurality of types of service.

33. A rate and power control device for a communication terminal of a communication system comprising:
a rate and power control module for performing the following steps:
obtaining an assigned target channel condition metric to be met at a first communication terminal for a signal received from each of one or more remote communication terminals, each communication terminal supporting a plurality of rates and a plurality of transmit power levels, the assigned target channel condition metric based upon the type of service supported by each of the one or more remote communication terminals; and
adjusting a respective assigned target channel metric for a respective one of the one or more of remote communication terminals in response to signal information generated from the signal received from the respective one of the one or more remote communication terminals;
wherein the rate and power control module additionally performs the following step:
determining a respective transmit power level and a respective rate that will satisfy the assigned target channel condition metric for each of the one or more remote communication terminals, the respective transmit power and the respective rate to be used by a respective one of the one or more remote communication terminals for a respective subsequent signal to be transmitted from the respective one of the one or more remote communication terminals to the first communication terminal;
wherein a respective signal received from a respective one of the one or more remote communication terminals was transmitted using a respective one of the plurality of rates and wherein the respective rate that satisfies a respective target channel condition metric comprises a different one of the plurality of rates, wherein the rate and power control module additionally performs the following step:
measuring a channel condition metric corresponding to each received signal; and
setting the respective rate to the respective one of the plurality of rates rather than the different one of the plurality of rates, in the event the measured channel condition metric for the respective received signal is within a hysteresis threshold of the target channel condition metric and in the event the system has been transmitting using the respective one of the plurality of rates for less than a specified number of iterations of the receiving and determining steps.

34. The device of claim 33 further comprising an integrated circuit device, the rate and power control module implemented within the integrated circuit device.

35. The device of claim 33 further comprising a transmitter coupled to the rate and power control module for transmitting the respective transmit power level and the respective rate for each of the one or more remote communication terminals to the respective one of the one or more remote communication terminals.

36. The device of claim 33 wherein the adjusting step performed by the rate and power control module comprises:
reducing the respective assigned target channel condition metric for the respective one of the one or more remote communication terminals in the event the respective transmit power level exceeds a maximum transmit power of the respective one of the one or more remote communication terminals.

37. The device of claim 33 wherein the adjusting and determining steps performed by the rate and power control module are performed at the first communication terminal, wherein the first communication terminal and the one or more remote communication terminals comprise a cell within a communication system comprising a plurality of cells, wherein the rate and power control module performs the adjusting and determining steps independent of rate and power adjustments made in others of the plurality of cells in the communication system, wherein a distributed rate and power control algorithm is provided.

38. The device of claim 33 further comprising a receiver of the first communication terminal, the rate and power control module coupled to the receiver.

39. The device of claim 33 wherein the adjusting step performed by the rate and power control module comprises:
adjusting the respective assigned target channel condition metric in response to the signal information generated from the received signal from the respective one of the one or more remote communication terminals, the signal information comprising one or more of a group consisting of: a measured channel condition metric corresponding to the received signal, a measured received signal strength of the received signal, and the results of an error detection process performed on the received signal.

40. The device of claim 33 wherein the adjusting step performed by the rate and power control module comprises:
reducing the respective assigned target channel condition metric in the event a measured received signal strength of the received signal from the respective one of the one or more remote communication terminals exceeds a threshold received signal strength of the first communication terminal.

41. The device of claim 40 further comprising:
a channel condition metric estimation module coupled to the rate and power control module for measuring a channel condition metric corresponding to each received signal and for measuring a received signal strength for each received signal.

42. The device of claim 33 the adjusting step performed by the rate and power control module comprises:
reducing the respective assigned target channel condition metric in the event an error detection process indicates that there is an error in the received signal from the respective one of the one or more remote communication terminals.

43. The device of claim 33 wherein the adjusting step performed by the rate and power control module comprises:

increasing the respective assigned target channel condition metric in the event an error detection process indicates that there are no errors in the received signal from the respective one of the one or more remote communication terminals.

44. The device of claim 33 wherein at least two of the one or more remote communication terminals supports a different one of a plurality of types of service.

45. A rate and power control system in a communication system comprising:

means for assigning a target channel condition metric to be met at a first communication terminal for signaling received from each of one or more remote communication terminals of the communication system, each communication terminal supporting a plurality of rates and a plurality of transmit power levels, each target channel condition metric based upon the type of service supported by each of the one or more remote communication terminals, means for receiving a signal at the first communication terminal from each of the one or more remote communication terminals;

means for adjusting a respective target channel condition metric assigned for a respective one of the one or more remote communication terminals in response to signal information generated from the received signal from the respective one of the one or more remote communication terminals; and means for determining a respective transmit power level and a respective rate that will satisfy the target channel condition metric for each of the one or more remote communication terminals, the respective transmit power and the respective rate to be used by a respective one of the one or more remote communication terminals for a respective subsequent signal to be transmitted from the respective one of the one or more remote communication terminals to the first communication terminal;

wherein the determining means is configured to solve, for each of the one or more remote communication terminals, the following equations for the respective transmit power level $p_i(n+1)$ and the respective rate $r_i(n+1)$ to be used by the respective one of the one or more remote communication terminals for the respective subsequent signal to be transmitted from the respective one of the one or more remote communication terminals to the first communication terminal:

$$p_i(n+1) = \max_{k \in \{1 \ldots L\}} \left\{ p_i(n) \frac{\gamma_i^k}{\gamma_i(n)} \,\middle|\, \forall k : p_i(n) \frac{\gamma_i^k}{\gamma_i(n)} < p_{\max} \right\}$$

and $$r_i(n+1) = \max_{k \in \{1 \ldots L\}} \left\{ r_i^k \,\middle|\, p_i(n) \frac{\gamma_i^k}{\gamma_i(n)} < p_{\max} \right\}$$

where $\gamma_i^k$ is the target channel condition metric for a given remote communication terminal, $\gamma_i(n)$ is the measured channel condition metric for a signal received from the given remote communication terminal, $p_i(n)$ is a transmit power level of the received signal from the given remote communication terminal, i is a terminal index of the one or more remote communication terminals, where i=1,2,3, . . . , I, where I≧1 and is a total number of the one or more remote communication terminals, k is a rate index where k=1, 2, 3, . . . , K, where K is a total number of the plurality of rates, and L is a highest rate of the plurality of rates supportable during the $n^{th}$ iteration.

46. The system of claim 45 further comprising means for transmitting the respective transmit power level and the respective rate for each of the one or more remote communication terminals to the respective one of the one or more remote communication terminals.

* * * * *